United States Patent
Shock et al.

(10) Patent No.: US 7,621,302 B2
(45) Date of Patent: Nov. 24, 2009

(54) CORIOLIS DOSING SYSTEM FOR FILLING GAS CYLINDERS

(75) Inventors: Robert Shock, Meriden, CT (US); James Gruenbacher, Meriden, CT (US); Steven Weiss, Naugatuck, CT (US)

(73) Assignee: Airgas, Inc., Cheshire, CT (US)

( * ) Notice: Subject to any disclaimer, the term of this patent is extended or adjusted under 35 U.S.C. 154(b) by 0 days.

(21) Appl. No.: 11/904,845

(22) Filed: Sep. 28, 2007

(65) Prior Publication Data

US 2009/0084194 A1 Apr. 2, 2009

(51) Int. Cl.
*B65B 3/26* (2006.01)

(52) U.S. Cl. .......................... 141/95; 141/104; 141/197; 141/236; 141/244; 141/302

(58) Field of Classification Search ............. 141/94–96, 141/100, 104, 236, 237, 242–244, 301–302, 141/197
See application file for complete search history.

(56) References Cited

U.S. PATENT DOCUMENTS

| | | | | | |
|---|---|---|---|---|---|
| 1,659,384 | A | * | 2/1928 | Thomas | 141/244 |
| 4,153,083 | A | * | 5/1979 | Imler et al. | 141/237 |
| 4,934,606 | A | | 6/1990 | Grataloup et al. | |
| 5,214,925 | A | | 6/1993 | Hoy et al. | |
| 5,454,408 | A | * | 10/1995 | DiBella et al. | 141/197 |
| 5,458,167 | A | * | 10/1995 | Schultz et al. | 141/197 |
| 5,738,126 | A | | 4/1998 | Fausten | |
| 5,826,632 | A | | 10/1998 | Micke et al. | |
| 5,881,779 | A | * | 3/1999 | Kountz et al. | 141/83 |
| 5,901,758 | A | * | 5/1999 | Hwang et al. | 141/197 |
| 5,927,321 | A | * | 7/1999 | Bergamini | 137/487.5 |
| 6,079,459 | A | * | 6/2000 | Klotz et al. | 141/94 |
| 6,439,278 | B1 | * | 8/2002 | Krasnov | 141/95 |
| 6,655,422 | B2 | | 12/2003 | Shock | |
| 6,722,399 | B1 | * | 4/2004 | Cano | 141/95 |
| 6,752,166 | B2 | * | 6/2004 | Lull et al. | 137/9 |

(Continued)

FOREIGN PATENT DOCUMENTS

JP 10103595 A 4/1998

(Continued)

OTHER PUBLICATIONS

International Search Report dated Mar. 24, 2009, application No. PCT/US2008/076584.

*Primary Examiner*—Timothy L Maust
*Assistant Examiner*—Nicolas A Arnett
(74) *Attorney, Agent, or Firm*—RatnerPrestia

(57) ABSTRACT

In a system including a gas source, a target cylinder for receiving gas, a conduit for carrying gas, and a valve for controlling the flow of gas, a method of dosing the target cylinder with gas is disclosed. The method comprises the step of calculating a mass flow rate for dosing the conduit and the target cylinder. The valve is biased to an open position to permit gas to flow through the conduit and into the target cylinder. The mass flow rate and the cumulative mass of gas flowing through the conduit are measured using a mass flow meter. The valve is biased to maintain the measured mass flow rate of gas flowing through the conduit substantially equivalent to the calculated mass flow rate. The valve is biased to a closed position once the measured cumulative mass of gas is substantially equivalent to the pre-determined mass of gas.

15 Claims, 9 Drawing Sheets

U.S. PATENT DOCUMENTS

| | | | |
|---|---|---|---|
| 6,779,568 B2 * | 8/2004 | Borck | 141/95 |
| 6,904,944 B2 * | 6/2005 | Satou et al. | 141/100 |
| 7,415,995 B2 * | 8/2008 | Plummer et al. | 141/302 |
| 2007/0051423 A1 * | 3/2007 | Handa | 141/94 |
| 2007/0079891 A1 * | 4/2007 | Farese et al. | 141/94 |

FOREIGN PATENT DOCUMENTS

| | | |
|---|---|---|
| JP | 10318496 A | 12/1998 |
| JP | 2004100824 A | 4/2004 |
| JP | 2005098474 A | 4/2005 |
| JP | 2006009885 A | 1/2006 |
| JP | 2002188797 A | 7/2006 |
| JP | 2007024152 A | 2/2007 |

* cited by examiner

ACUDOSE AUTOMATED VESSEL FILLING SCHEMATIC - METERED SOURCE

ACUDOSE AUTOMATED VESSEL FILLING SCHEMATIC – METERED TARGET

CORIOLIS DOSING SYSTEM FOR FILLING GAS CYLINDERS

FIELD OF THE INVENTION

The disclosed invention relates to a system and method for filling one or more gas cylinders with gas.

BACKGROUND OF THE INVENTION

Gases that are to be shipped to various locations are generally packaged in portable vessels of various shapes and sizes which are capable of withstanding high pressures and which can be conveniently shipped. Typical of such vessels are the cylindrical containers commonly known as gas cylinders or gas bottles. These vessels are generally filled with gases by charging the gas into the vessel until the desired pressure is reached.

For many years, the process of filling cylinders with gases or gas mixtures was performed manually by an operator. The operator would distribute gases from large storage cylinders filled with liquefied gases, such as oxygen, nitrogen, argon, carbon dioxide and helium, into one or more smaller target cylinders. The operator would simultaneously fill any number of target cylinders via a manifold connected to the one or more storage cylinders. Each target cylinder was filled with the specified gas or gas mixture to a pre-determined pressure at a stated temperature.

In one conventional method of creating a gas mixture, the various component gases distributed into the target cylinder are successively weighed to obtain the desired gas ratios. In performing these various steps, the operator would continuously monitor the weight of the cylinders, the temperature of the cylinders and the pressures in the system. The entire process was very time consuming and resulted in lost time for the operator and the equipment.

In view of the foregoing, it would be advantageous to further develop and refine systems for filling cylinders with gas in the interests of convenience and reduced operating costs.

SUMMARY OF THE INVENTION

According to an aspect of the invention, a system for filling one or more target cylinders with gas is provided. The system comprises at least one gas source, at least one target cylinder for receiving gas from the gas source, and at least one conduit for distributing gas between the gas source and the target cylinder. At least one valve is provided for controlling the flow of gas through the at least one conduit. At least one mass flow meter is provided for measuring a mass value of the gas flowing through the conduit. The mass flow meter is configured to transmit or record data corresponding to the mass value. At least one transmitter configured for receiving mass values from the mass flow meter is provided. The at least one transmitter is also configured to bias at least one valve to control the flow of gas through the at least one conduit based upon the mass values received from the mass flow meter.

According to another aspect of the invention, a method of dosing the at least one target cylinder with a pre-determined mass of gas is provided. The method comprises the step of calculating a mass flow rate for dosing the at least one conduit and at least one target cylinder. The at least one valve is biased to an open position to permit gas to flow through the conduit and into the target cylinder. The mass flow rate and the cumulative mass of gas flowing through the conduit are measured using a mass flow meter. At least one valve is biased to maintain the measured mass flow rate of gas flowing through the conduit substantially equivalent to the calculated mass flow rate. At least one valve is biased to a closed position once the measured cumulative mass of gas is substantially equivalent to the pre-determined mass of gas.

According to yet another aspect of the invention, a method of dosing the at least one conduit with a pre-determined mass of gas is provided. The method comprises the step of calculating a mass flow rate for dosing the at least one conduit. At least one valve is biased to an open position to permit gas to flow through the conduit. The mass flow rate and the cumulative mass of gas flowing through the conduit are measured using a mass flow meter. At least one valve is biased to maintain the measured mass flow rate of gas flowing through the conduit substantially equivalent to the calculated mass flow rate. At least one valve is biased to a closed position once the measured cumulative mass of gas is substantially equivalent to the pre-determined mass of source gas.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The invention is best understood from the following detailed description when read in connection with the accompanying drawing, which shows exemplary embodiments of the invention selected for illustrative purposes. The invention will be illustrated with reference to the figures. Such figures are intended to be illustrative rather than limiting and are included herewith to facilitate the explanation of the present invention. In the various embodiments like item numbers represent substantially similar features.

Figure 1:
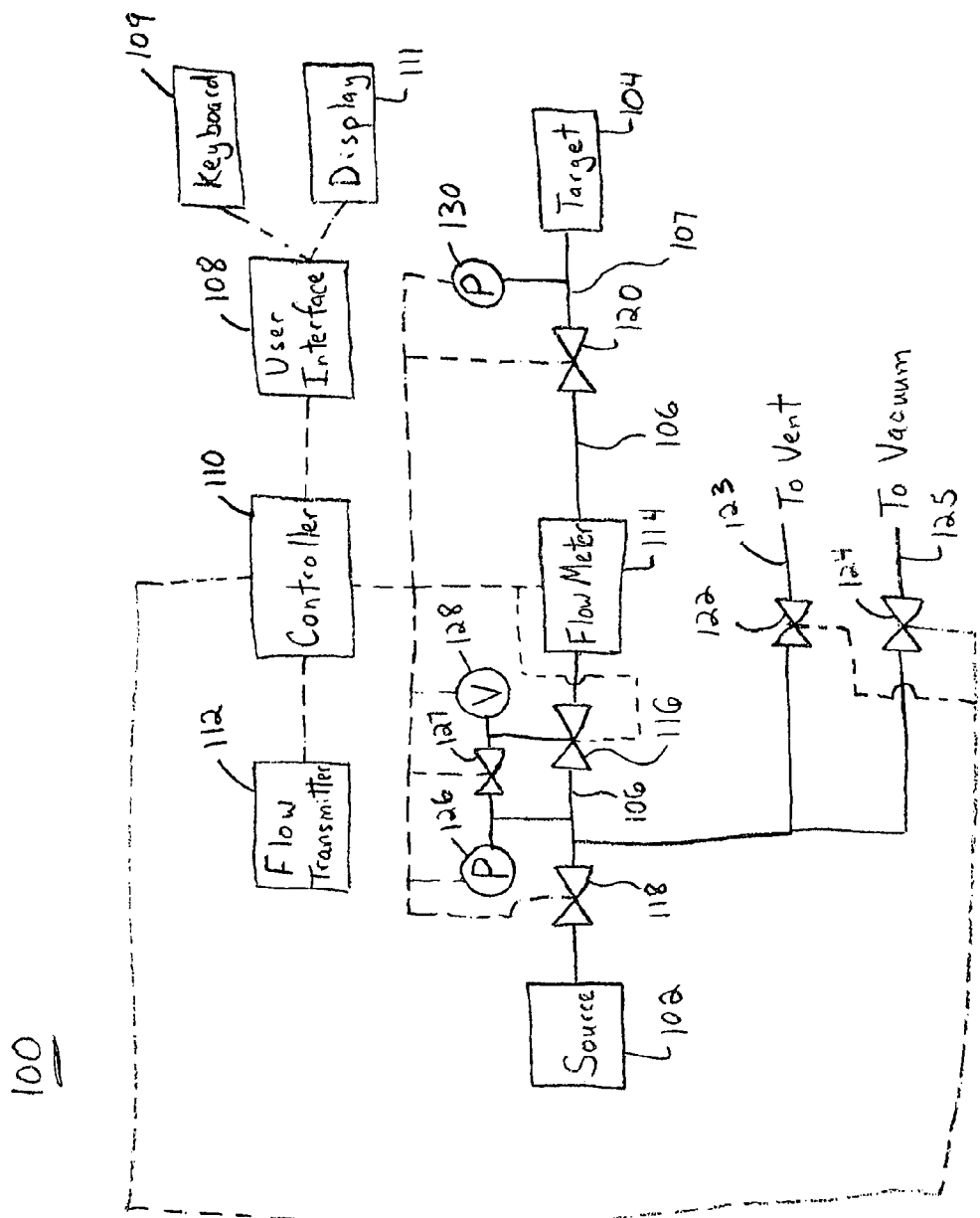
FIG. 1 is a schematic view of an automated vessel filling system according to a first exemplary embodiment of the invention.

FIG. 1 depicts a schematic view of a simplified arrangement of an automated vessel filling system 100 (system 100 hereinafter) according to a first exemplary embodiment of the invention. In the schematic, gas flow paths are illustrated by solid lines and signal flow paths are illustrated by broken lines.

The system 100 includes a gas source 102, a target cylinder 104 for receiving gas from source 102, and a conduit 106 for delivering gas from source 102 to target cylinder 104. A pigtail 107 is releasably coupled between conduit 106 and target cylinder 104 for carrying gas directly into target cylinder 104. According to aspects of the invention, source 102 may be a large gas cylinder or other vessel for containing source gas. The target cylinder 104 may be a cylinder for containing a pressurized gas, or any other type of vessel for containing gas. The conduit 106 may be a hollow pipe, and pigtail 107 may be a flexible hose, for example.

An automated control system monitors and controls the flow of gas through conduit 106. According to this exemplary embodiment, the automated control system generally comprises a user interface 108, a controller 110, a flow transmitter 112 and a flow meter 114. Each component of the automated control system performs a unique function in monitoring and controlling the passage of gas from source 102 to target cylinder 104. The components of the automated control system may vary from that shown and described herein without departing from the scope of the invention.

With respect to the individual components of the automated control system, user interface 108 may be, for example, a personal computer including a keyboard 109 and a display 111 (such as a monitor). In operation, a user instructs the automated control system to perform a specified command via keyboard 109 of user interface 108. For example, a user may instruct the automated control system to fill target cylinder 104 with a pre-determined mass (or volume) of gas from source 102. The instructions entered into user interface 108 are ultimately transmitted to flow transmitter 112 via controller 110 for filling (i.e., dosing) target cylinder 104. The process of distributing gas at a high velocity through system 100 is commonly referred to in the art as "dosing."

The controller 110 is a communications interface or link between user interface 108, flow transmitter 112, flow meter 114, and valve 116, as will be described hereinafter. Data is transmitted to and from controller 110 and the remaining components of the automated control system. According to this exemplary embodiment, the controller biases variable valve 116 between an open position and a closed position to control the flow rate of gas through the system 100. The controller 110 adjusts valve 116 to maintain the mass flow rate through conduit 106 substantially constant. The controller 110 may be a separate component or integral with user interface 108. Similarly, flow transmitter 112 may also be a separate component (as shown) or integral with user interface 108.

The flow transmitter 112 receives instructions from controller 110 to fill target cylinder 104. The flow transmitter 112 biases discrete valves 118 and 120 between an open and a closed position to either permit or prohibit the flow of gas through the system 100. Once the filling process begins, flow transmitter 112 continuously receives data from flow meter 114. The data corresponds to the instantaneous mass flow rate and cumulative mass flow total of the gas flowing through flow meter 114.

According to one aspect of the invention, valve 116 is a variable valve that may be positioned to an open, a partially open, or a closed state, whereas valves 118 and 120 are discrete valves that may be positioned to either an open or a closed state.

The flow meter 114 measures the amount of mass of the gas flowing therethrough. The flow meter 114 may be commonly referred to in the art as an inertial flow meter or a coriolis flow meter. In addition to measuring the instantaneous mass flow rate, flow meter 114 also maintains a cumulative total of the mass flowing therethrough. The flow meter 114 constantly transmits high-speed data signals (associated with the instantaneous mass flow rate and cumulative mass flow total) to flow transmitter 112. The flow meter 114 may be configured to store the data, as well as transmit the data. Suitable flow meters are available from Micro Motion, Inc. of Boulder, Colo., USA.

The flow transmitter 112 utilizes the data received from flow meter 114 to determine the point at which target cylinder 104 is filled with the pre-determined mass of source gas. Once target cylinder 104 is nearly filled with the pre-determined mass of source gas, flow transmitter 112 closes valves 118 and 120. Suitable flow transmitters are available from Micro Motion, Inc. of Boulder, Colo., USA.

Prior to filling a target cylinder 104 with source gas, the contents of target cylinder 104, conduit 106 and pigtail 107 may be evacuated, if so desired, to ensure the purity of the system 100. Accordingly, system 100 includes a vent conduit 123 and associated valve 122 for venting gas that is contained within target cylinder 104, conduit 106 and pigtail 107. Additionally, a vacuum pumping system (not shown) may be connected to conduit 125 for drawing a vacuum through target cylinder 104, conduit 106 and pigtail 107 to evacuate their contents. A discrete valve 124 is associated with conduit 125 for controlling the release of gas through conduit 125 under the vacuum source. The discrete valves 122 and 124 receive instructions from controller 110 for opening and closing. The discrete valves 122 and 124 are only opened for venting, vacuuming or purging system 100.

The system includes a pressure sensor 126 and a vacuum transducer 128 for measuring the pressure and vacuum of the system 100, respectively. A valve 127 is provided adjacent vacuum transducer 128 for selectively exposing vacuum transducer 128 to a vacuum condition within conduit 106. Additionally, the system 100 includes a pressure sensor 130 for measuring the pressure of target cylinder 104. The controller 110 communicates with pressure sensors 126 and 130 and vacuum transducer 128 for periodically monitoring the pressure and vacuum levels of system 100, as described in greater detail with reference to FIG. 3A.

Although only one gas source 102 and one target cylinder 104 is described with reference to FIG. 1, an automated vessel filling system may include any number or arrangement of gas sources and target cylinders. Alternative exemplary embodiments of the invention illustrating a plurality of gas sources and target cylinders are described with reference to FIGS. 4-6.

Figure 2:
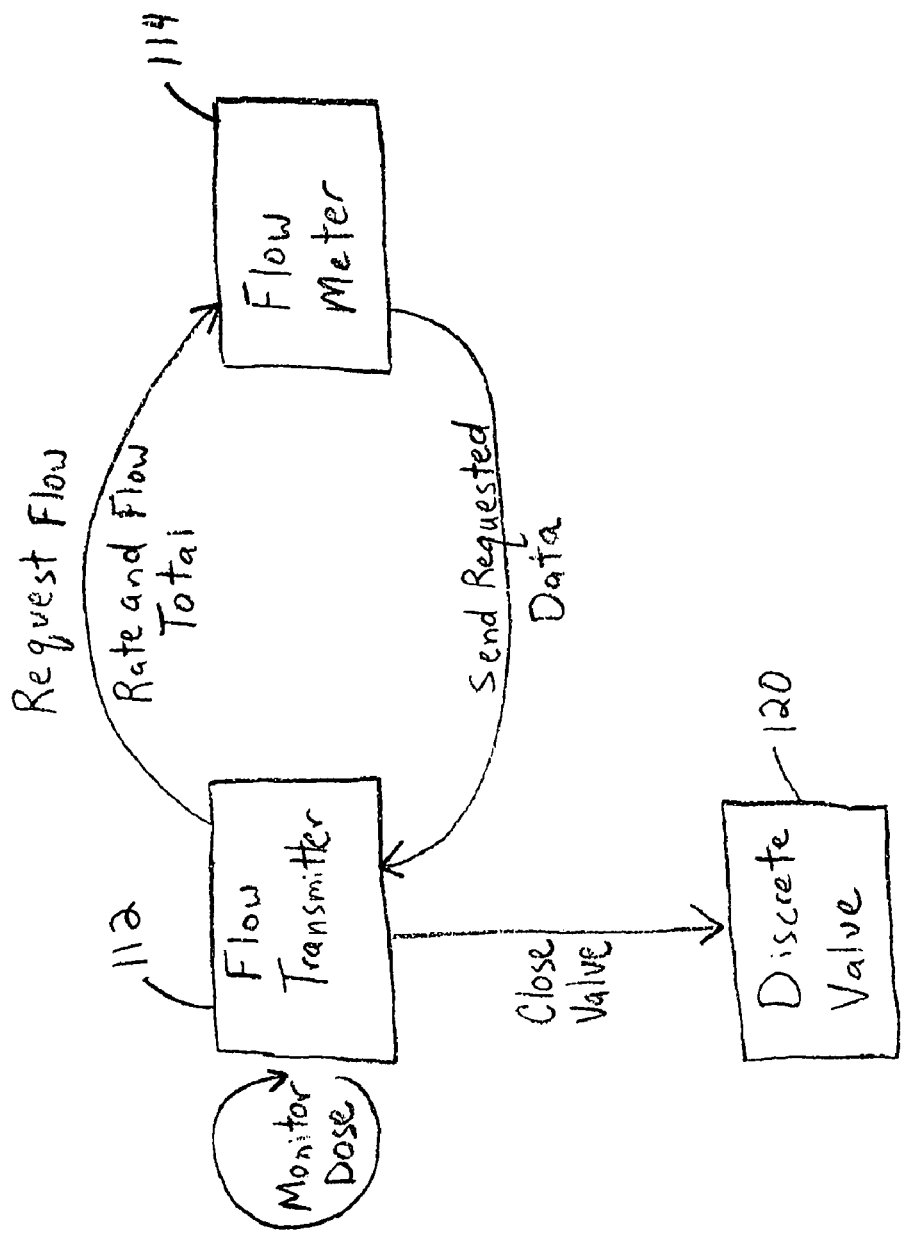
FIG. 2 is a block diagram illustrating communications between a flow meter, a flow transmitter and one or more discrete valves of the automated vessel filling system of FIG. 1 according to an aspect of the invention.

FIG. 2 depicts a schematic illustrating data communications between flow transmitter 112, flow meter 114 and discrete valve 120 (or valve 118). The controller 110 and user interface 108 have been omitted for simplicity. The flow transmitter 112 transmits high-speed data signals requesting the instantaneous mass flow rate and cumulative mass flow totals from flow meter 114. In response, flow meter 114 transmits high-speed data signals associated with the instantaneous mass flow rate and cumulative mass flow total to flow transmitter 112. The flow transmitter 112 constantly monitors the instantaneous and cumulative mass flow measurements reported by flow meter 114, as described with greater detail with reference to steps 222 and 236 of FIGS. 3A and 3B, respectively. Once flow transmitter 112 detects that target cylinder 104 is nearly filled with the pre-determined mass of source gas, flow transmitter 112 instructs valve 120 to close.

By virtue of the accuracy of flow meter 114 and flow transmitter 112, system 100 is capable of dosing a target cylinder within an accuracy range of between 500 ppb (parts per billion) and 5,000 ppm (parts per million). In contrast, conventional gas cylinder filling system, which utilize weight measurements, are typically limited to the accuracy of a weight scale, which may be 1/100 of a gram.

To accurately fill target cylinder 104 with the pre-determined mass of source gas, flow transmitter 112 compensates for the latency of system 100. More particularly, an inherent latency exists between the moment flow transmitter 112 instructs valve 120 to close and the moment valve 120 actually closes. Utilizing an algorithm referred to herein as Automatic Overshoot Compensation (AOC), flow transmitter 112 closes valves 118 and 120 just prior to filling target cylinder 104 with the pre-determined mass of source gas to compensate for the latency of the system 100.

FIGS. 3A-3D depict flow charts illustrating an exemplary method (comprising steps 200 through 250) of operating an automated vessel filling system according to another aspect of the invention. Although the steps of the flow chart are described hereinafter with reference to system 100 of FIG. 1, it should be understood that the exemplary steps of the flow chart may be practiced with the systems illustrated in FIGS. 4-6 or any other automated vessel filling system. Additionally, the steps are not limited to any particular sequence and may deviate from that described herein.

Figure 3A:
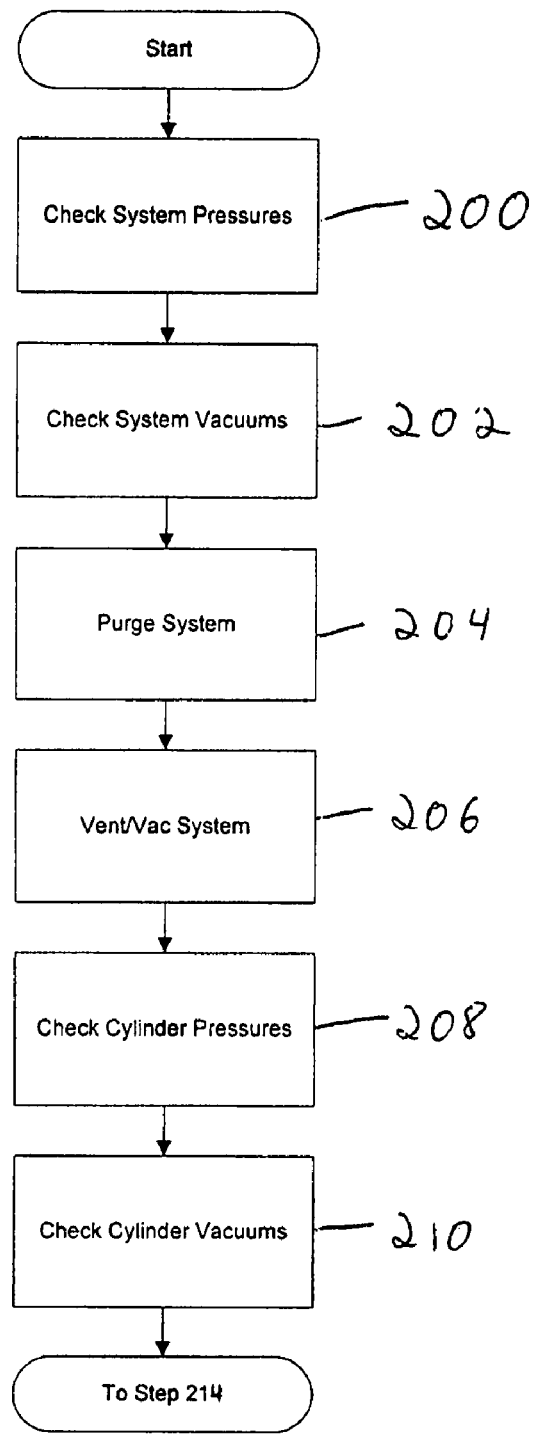
FIGS. 3A-3D depict flow charts illustrating an exemplary method of operating an automated vessel filling system according to another aspect of the invention.

Steps 200 through 210 of FIG. 3A depict the steps for preparing an automated vessel filling system 100 prior to filling the target cylinder with a pre-determined mass of source gas. At step 200, controller 110 monitors the system pressure that is indicated by pressure sensors 126 and 130. At step 202, controller 110 opens valve 116, 120 and 127 to monitor the system vacuum indicated by vacuum transducer 128. Steps 200 and 202 are useful for detecting any leaks or instability of system 100.

At step 204, system 100 is purged, i.e., valves 116, 118 and 120 are opened to allow the system to be partially filled with gas from source 102 (or another gas). Valve 118 is then closed. To vent the system, valves 116, 120 and 122 are opened (valve 118 remains closed) and gas is permitted to escape from conduit 106, and pigtail 107 through open vent valve 122 and vent conduit 123.

At step 206, valves 116, 120 and 124 are opened (valve 118 remains closed) and a vacuum pumping system (not shown) is connected to conduit 125 to draw a vacuum to evacuate the gas in conduit 106 and pigtail 107. Steps 204 and 206 may be repeated as necessary to achieve the desired purity of system 100.

At step 208, controller 100 monitors the internal pressure of target cylinder 104 indicated by pressure sensor 130. Similarly, at step 210, controller 100 opens valves 116, 120 and 127 to monitor the system vacuum indicated by vacuum transducer 128. Once steps 200 through 210 are complete, system 100 is ready to be supplied with source gas 102.

Figure 3B:
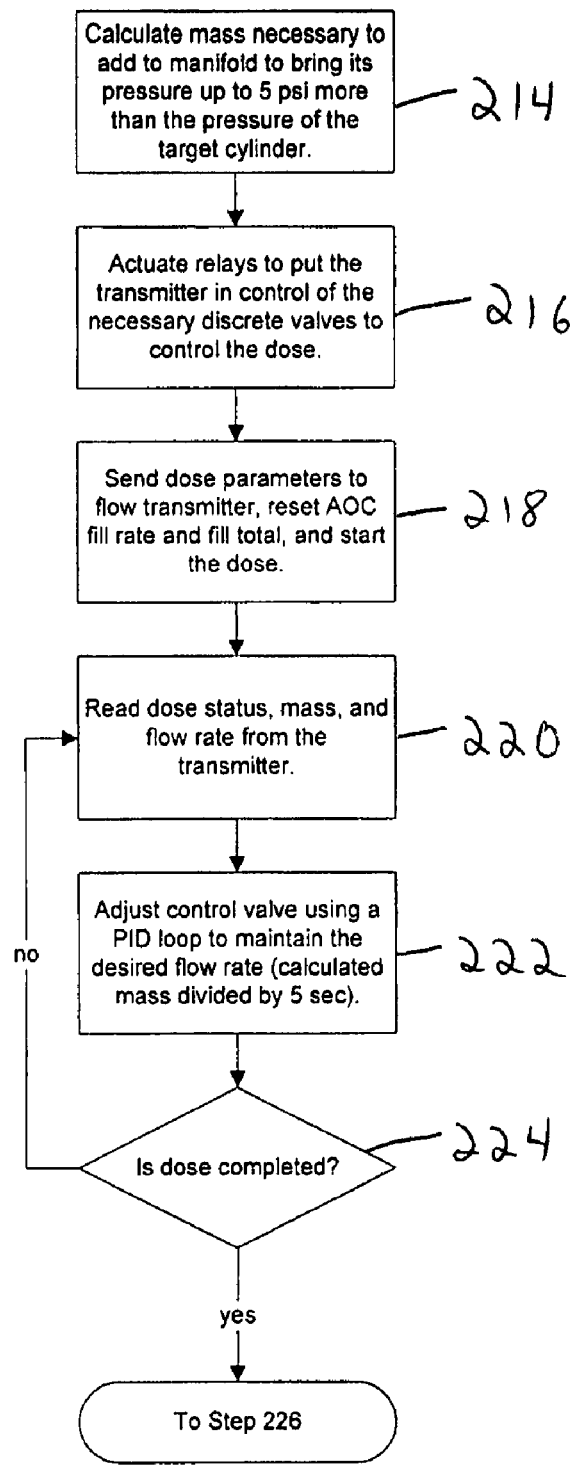

Steps 214 to 224 of FIG. 3B depict the process of dosing (i.e., filling) conduit 106 with a pre-determined mass of source gas (i.e., a gas component) prior to filling target cylinder 104 with gas. These steps are necessary to ensure that gas does not backflow out of target cylinder 104 upon opening valve 120. While it was described in steps 200-210 that the contents of target cylinder 104 are initially evacuated, it will be understood with reference to step 240 of FIG. 3C that target cylinder 104 may contain one or more gas components depending upon the stage of the entire vessel filling process. Thus, if target cylinder 104 contains one or more gas components conduit 106 must be filled with a pre-determined mass of source gas to prevent the backflow of gas out of target cylinder 104. Steps 214-224 may also be practiced even if target cylinder 104 does not contain any gas components.

At step 214, controller 110 calculates the mass of gas required to add to conduit 106 to maintain the pressure of conduit 106 greater than the internal pressure of target cylinder 104. Because gas tends to flow towards the region of lowest pressure, gas within target cylinder 104 will remain in target cylinder 104 upon opening valve 120, if the pressure of conduit 106 is greater than the internal pressure of target cylinder 104. For example, the pressure of the gas conduit 106 may be maintained five (5) pounds per square inch (psi) greater than the internal pressure of target cylinder 104 to prevent back-flow of gas out of target cylinder 104.

The ideal gas law equation (P*V=n*R*T) is utilized to calculate the mass of gas required to add to conduit 106 to maintain the pressure of conduit 106 five (5) psi greater than the internal pressure of target cylinder 104. A compressibility factor 'Z' is incorporated into the ideal gas law to compensate for the compressibility of gas, yielding equation 1.

$$PV = NRTZ \tag{Eq. 1}$$

The mass 'm' of gas required to maintain the volume of conduit 106 at the desired pressure is equal to the product of the moles of the gas 'n' and the molar mass 'MM' of the gas. The equation to solve for mass 'm' is shown in equation 2.

$$m = MM*n \tag{Eq. 2}$$

Furthermore, the desired mass 'm' is also equal to the mass required to fill the conduit 106 at the cylinder's current pressure (plus 5 psi), less the amount of mass currently in the conduit 106, as shown in equation 3. In equation 3, the variable '$m_{man-f}$' corresponds to the mass of gas within the conduit 106 (with conduit 106 at 5 psi above the cylinder's current pressure). The variable '$m_{man-I}$' corresponds to the mass of gas currently within the conduit 106.

$$m = m_{man-f} - m_{man-i} \tag{Eq. 3}$$

Equations 4 and 5 illustrate the individual equations for solving for the variables '$m_{man-f}$' and '$m_{man-i}$'. In equations 4 and 5, the variable '$P_{cyl}$' corresponds to the pressure in the cylinder 104 before the dose. The variable '$P_{man}$' corresponds to the current pressure of the conduit 106. The variable '$V_{man}$' corresponds to the volume of the conduit 106 from the meter 114 up to the cylinder discrete valve 120. The variable '$Z_{man-f}$' corresponds to the compressibility factor of the current gas component at the cylinder's current pressure (plus 5 psi). The variable '$Z_{man-I}$' corresponds to the compressibility factor of the current gas component at the current pressure of conduit 106. Calculation of variables '$Z_{man-f}$' and '$Z_{man-I}$' is described in greater detail in Appendix A and Appendix B.

$$m_{man-f} = \frac{(P_{cyl} + 5 \text{ psi})V_{man}MM}{RTZ_{man-f}} \tag{Eq. 4}$$

$$m_{man-i} = \frac{P_{man}V_{man}MM}{RTZ_{man-i}} \tag{Eq. 5}$$

Combining equations 3, 4 and 5 to solve for the mass 'm' required to add to the conduit 106 yields equation 6.

$$m = \left(\frac{V_{man}MM}{RT}\right)\left[\frac{P_{cyl} + 5 \text{ psi}}{Z_{man-f}} - \frac{P_{man}}{Z_{man-i}}\right] \tag{Eq. 6}$$

At step 216, the system 100 readies itself for dosing conduit 106 with gas by actuating relays (not shown) to put flow transmitter 112 in control of discrete valve 118.

At step 218, controller 110 transmits the dose parameters to flow transmitter 112, and instructs flow transmitter 112 to begin dosing conduit 106 with gas from source 102 by opening valve 118. The dose parameters include (1) the mass 'm' of gas required to add to conduit 106 (solved for at step 214) and (2) the maximum allowable time for distributing the source gas into conduit 106 (referred to as dose time or '$t_d$' herein). If the dose takes longer than the maximum allowable time specified, flow transmitter 112 will end the dose. Previously recorded gas fill rates and totals may be reset at step 218.

One method for calculating the mass flow rate 'm' is to divide the desired mass 'm' by the desired dose time 't' set by the user. Another method for establishing the mass flow rate 'm' is to simply adopt the maximum rated flow rate of flow meter 114, while maintaining the total dose time 't' above a minimum acceptable time. The minimum acceptable time should be sufficient to permit flow transmitter 112 to react quickly enough to close valve 118.

Referring still to step 218, after receiving the dose parameters, flow transmitter 112 opens valve 118 thereby permitting gas to flow from source 102 into conduit 106. The source gas is distributed into conduit 106 and through flow meter 114 (valve 120 is set to a closed position).

At step 220, controller 110 communicates with flow transmitter 112 to monitor the status of the dose. As described with reference to FIG. 2, once the dose starts, flow transmitter 112 transmits high-speed data signals requesting instantaneous and cumulative mass flow values from flow meter 114. In response, flow meter 114 transmits high-speed data signals associated with the instantaneous and cumulative mass flow values to flow transmitter 112.

At step 222, controller 110 adjusts the setting of control valve 116 to maintain the mass flow rate 'm' at the predetermined rate established at step 218. The setting of control valve 116 is changed in response to the instantaneous and cumulative mass flow values reported by flow meter 114.

The controller 110 may employ a proportional integral derivative (PID) loop to maintain the mass flow rate 'm' at the desired rate by adjusting the setting of control valve 116. Briefly, a PID controller (e.g., controller 110) is a control loop feedback mechanism widely used in industrial control systems. The PID controller attempts to correct the error between a measured process variable and a desired setpoint by calculating and then outputting a corrective action that can adjust the process accordingly. The PID controller algorithm involves three separate parameters; the proportional, the integral and derivative values. The proportional value determines the reaction to the current error, the integral determines the reaction based on the sum of recent errors and the derivative determines the reaction to the rate at which the error has been changing. The weighted sum of these three actions is outputted to a control element. According to this invention, the control element is the position of control valve 106.

Because PID loop gains are not sufficient for all pressure differentials and gases, the PID gains used for system 100 are calculated from a function that corresponds to a best curve fit derived experimentally from several gains. The following points were derived experimentally using Nitrogen at various pressures, for example:

TABLE 1

PID Values for Nitrogen

| Pressure (psi) | Proportional | Integral | Derivative |
|---|---|---|---|
| 480 | 0.5852 | 0.004 | 0 |
| 1550 | 0.2 | 0.01 | 0 |
| 2000 | 0.1 | 0.011 | 0 |

The points listed in Table 1 were then fit to equation 7 (x corresponds to the pressure differential between the source and the manifold):

$$y = A + Bx + Cx^2 \qquad (Eq.\ 7)$$

The following coefficients resulted:

TABLE 2

Coefficients of PID Loop

| Coefficient | Proportional | Integral |
|---|---|---|
| A | 0.8254386 | −0.00045335 |
| B | −0.000544 | 1.02482145 |
| C | 9.0643275 | −2.26072010 |

Once the proportional and the integral values have been calculated, those values are scaled linearly based on the Molar Mass (MM) of the current component as shown in equations 8 and 9. In equations 8 and 9, $A_p$ corresponds to the proportional value for coefficient A, $A_I$ corresponds to the integral value for coefficient A, and so forth:

$$\text{Proportional} = (A_P + B_P x + C_P x^2)\left(\frac{28.0134}{MM}\right) \qquad (Eq.\ 8)$$

$$\text{Integral} = (A_I + B_I x + C_I x^2)\left(\frac{MM}{28.0134}\right) \qquad (Eq.\ 9)$$

Based upon the output of the PID loop, the controller 110 adjusts the position of variable valve 116 to regulate the mass of source gas flowing therethrough. According to one aspect of the invention, the output of the PID may be limited to deviate by twenty (20) percent per second, for example, in an effort to promote smooth and controlled motion of valve 116.

At step 224, controller 110 queries the flow transmitter 112 to determine if the dose of source gas into conduit 106 is complete. The flow transmitter 112 determines if the dose is complete by comparing the measured cumulative mass flow value reported by flow meter 114 with the mass of source gas calculated at step 214. The process returns to step 220 if the dose is not complete, whereupon controller 110 continues to communicate with flow transmitter 112 to monitor the status of the dose. Once the measured cumulative mass flow value is nearly equal to the calculated mass of source gas, flow transmitter 112 closes discrete valve 118. As stated previously, flow transmitter 112 compensates for the latency of system 100 by prematurely closing discrete valve 118.

After step 224, conduit 106 should be filled with the pre-determined mass of source gas to bring the pressure of conduit 106 five (5) psi greater than the internal pressure of target cylinder 104. Thereafter, target cylinder 104 may be filled with a pre-determined mass of source gas.

Figure 3C:
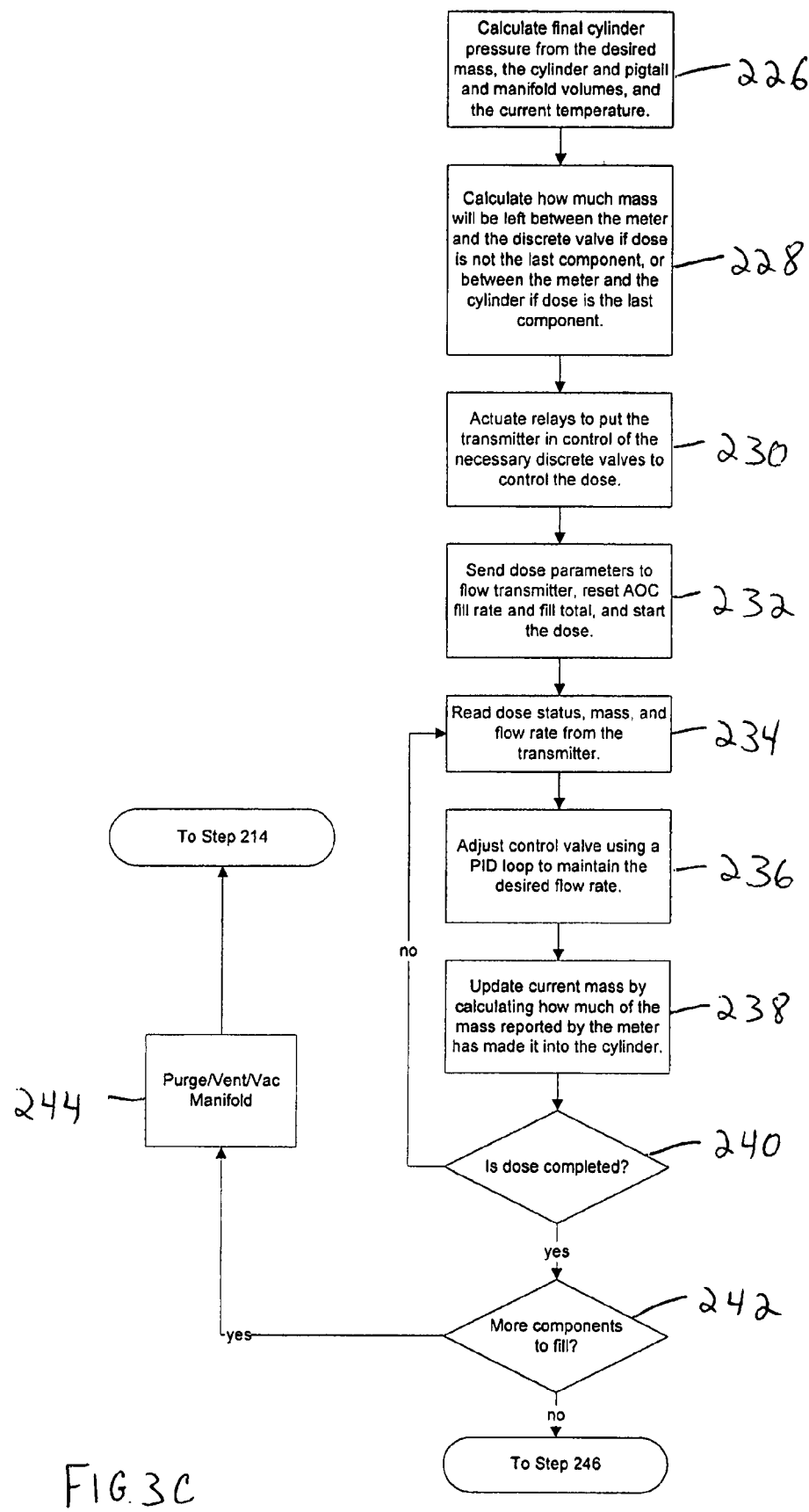
Figure 3D:
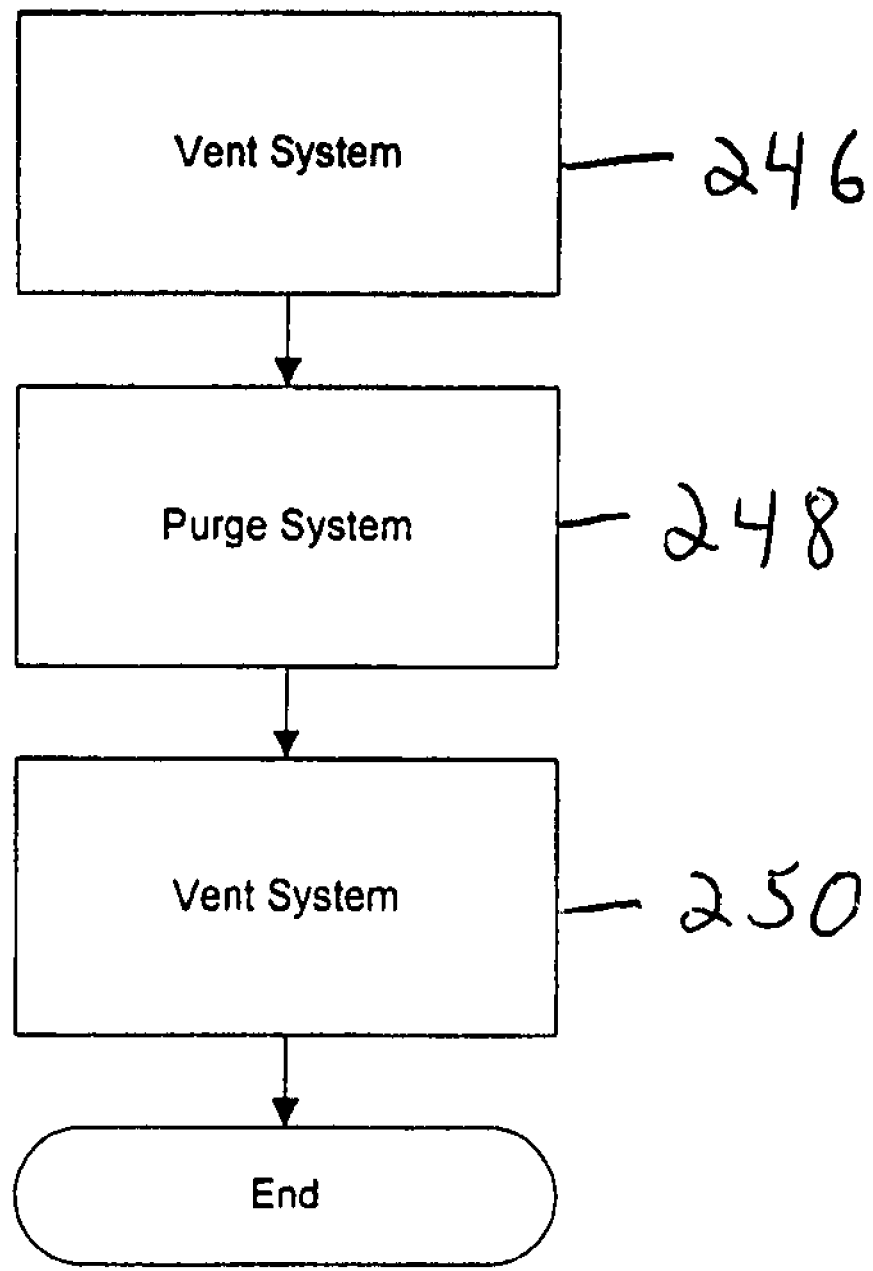

FIG. 3C depicts the process for dosing target cylinder 104 with source gas, according to one aspect of the invention. The target cylinder 104 may be dosed with a single gas component (e.g., nitrogen), or multiple gas components (e.g., nitrogen and argon) to create a gas mixture. Accordingly, system 100 may include a single gas source 102 (as shown), or a plurality of gas sources (see FIGS. 4-6). According to one aspect of the invention, the gas components are sequentially added to target cylinder 104 to create a gas mixture.

At steps 226 and 228, controller 110 calculates the mass of source gas required to add to system 100 and the final pressure of target cylinder 104 (i.e., after dosing target cylinder 104). The mass of source gas 'm' required to add to system 100 for a single dose includes several constituents, namely, (1) the mass of source gas desired to add to target cylinder 104 (referred to as '$m_d$'), (2) the mass of source gas remaining in the pigtail 107 after the dose (referred to as '$m_{pig}$'), and (3) the mass of source gas remaining in conduit 106 between the flow meter 114 and discrete valve 120 (referred to as '$m_{met}$'). The equation for calculating the total mass 'm' is shown in equation 10.

$$m = m_d + m_{pig} + m_{met} \quad \text{(Eq. 10)}$$

The mass desired to add to the cylinder '$m_d$' is supplied by the user via user interface 108. The mass left in the pigtail '$m_{pig}$' is only compensated for on the final gas component because the gas within the pigtail will be pushed into target cylinder 104 by subsequent gas components added to system 100. Thus, $m_{pig}=0$ for all components except the last gas component added to target cylinder 104. The mass of source gas remaining in the pigtail (i.e., '$m_{pig}$') following the addition of the last gas component is equal to the amount of the gas component that the pigtail will hold at the final target cylinder pressure (referred to as $P_{cyl-f}$).

The final cylinder pressure $P_{cyl-f}$ in target cylinder 104 is equal to the sum of the following variables, as shown in equation 11: (1) the pressure in target cylinder 104 before the gas component is added (referred to as $P_{cyl-i}$), (2) the pressure added to target cylinder 104 by the gas component (referred to as $P_{comp}$), and (3) the pressure added to target cylinder 104 by the gas contained within pigtail 107 (referred to as $P_{pig}$).

$$P_{cyl-f} = P_{cyl-i} + P_{comp} + P_{pig} \quad \text{(Eq. 11)}$$

The initial target cylinder pressure $P_{cyl-i}$ is a known value that is monitored by a pressure gauge of the target cylinder. The pressure added to target cylinder 104 by the gas component (i.e., $P_{comp}$) is calculated using combination of the ideal gas law and Soave's formula, as shown in equation 12. The variable '$V_{tar}$' corresponds to the target volume. If the gas component is the final gas component added to cylinder 104, '$V_{tar}$' is equal to the volume of target cylinder 104. For all other gas components, $V_{tar}$ is equal to the combined volume of cylinder 104 and pigtail 107.

$$P_{comp} = \frac{RT}{\frac{V_{tar}(MM)}{m_d} - b} - \frac{\Theta}{\left(\frac{V_{tar}(MM)}{m_d}\right)^2 + \delta\left(\frac{V_{tar}(MM)}{m_d}\right) + \varepsilon} \quad \text{(Eq. 12)}$$

The target volume $V_{tar}$ compensates for the pigtail volume $V_{pig}$ in all of the doses preceding the final gas component added to cylinder 104. Thus, the pressure contributed to the target volume $V_{tar}$ by the gas within pigtail 107 will only be non-zero for the final gas component added to cylinder 104. It follows that $P_{pig}$ is equal to zero if the current gas component is not the final component, while $P_{pig}$ is not equal to zero if the current gas component is the final component.

Equation 13 illustrates the formula for calculating the initial pressure of the gas within the pigtail $P_{pig-i}$.

$$P_{pig-i} = \frac{mRT}{V_{pig}MM} \quad \text{(Eq. 13)}$$

The ratio of the pigtail volume $V_{pig}$ to the cylinder volume $V_{cyl}$ is then multiplied with the equation for the initial pigtail pressure $P_{pig-i}$, yielding equation 14.

$$P_{pig} = \frac{mRT}{V_{pig}MM} \cdot \left(\frac{V_{pig}}{V_{cyl}}\right) = \frac{mRT}{V_{cyl}MM} \quad \text{(Eq. 14)}$$

Equation 15 illustrates another formula for calculating the gas pressure within the pigtail 107 (assuming that the current gas component is the final gas component).

$$P_{pig} = P_{cyl-i}\left(\frac{V_{pig}}{V_{cyl}}\right) \quad \text{(Eq. 15)}$$

Once $P_{comp}$ and $P_{pig}$ are calculated ($P_{cyl-i}$ is a known quantity), the final cylinder pressure $P_{cyl-f}$ may be solved for using equation 11. Once $P_{cyl-f}$ is solved for, the mass of the last gas component that will be left in the pigtail after dosing the system (i.e., $m_{pig}$) may be solved for. The equation for $m_{pig}$ is derived from the Ideal Gas Law, as shown hereinafter.

$$m_{pig} = \left[\frac{P_{cyl-f} * V_{pig} * MM}{RTZ_{cyl-f}}\right] \quad \text{(Eq. 16)}$$

The final cylinder pressure $P_{cyl-f}$ is then utilized to calculate the mass of gas ($m_{met}$) contained within the conduit between the flow meter 114 and the discrete valve 120. Because the conduit volume $V_{met}$ is pressurized five (5) psi (in this example) above the pressure of target cylinder 104 prior to starting the gas component dose, it is then necessary to calculate the mass of additional source gas added to the conduit volume $V_{met}$ during the gas component dose. As will become evident with reference to FIGS. 4-6, the volume of the conduit $V_{met}$ may depend upon the location of the flow meter.

The mass of the additional source gas added to the conduit $m_{met}$ during the gas component dose will be equal to the amount of mass in conduit volume $V_{met}$ contributed by the difference of the final cylinder pressure $P_{cyl-f}$ and the current conduit pressure $P_{met}$, yielding equation 17. In equation 17, the variable '$V_{met}$' corresponds to the volume from the flow meter 114 to the discrete valve 120. The variable '$P_{met}$' corresponds to the pressure in $V_{met}$ before the component addition. The variable '$Z_{met}$' corresponds to the compressibility factor of the gas in $V_{met}$ prior to the component addition. The variable '$Z_{cyl-f}$' corresponds to the compressibility factor of the gas in $V_{met}$ at the final cylinder pressure.

$$m_{met} = \left(\frac{V_{met}MM}{RT}\right)\left(\frac{P_{cyl-f}}{Z_{cyl-f}} - \frac{P_{met}}{Z_{met}}\right) \quad \text{(Eq. 17)}$$

Combining the foregoing equations, the formula to solve for the mass of the gas component 'm' added to system 100 if the current gas component to be added to cylinder 104 is not the final gas component is expressed by equation 18.

$$m = m_d + \left(\frac{V_{met} MM}{RT}\right)\left(\frac{P_{cyl-f}}{Z_{cyl-f}} - \frac{P_{met}}{Z_{met}}\right) \quad \text{(Eq. 18)}$$

The formula to solve for the mass of the gas component 'm' added to system 100 if the current gas component is the final gas component to be added to cylinder 104 is expressed by equation 19.

$$m = m_d + \left(\frac{MM}{RT}\right)\left[\left(\frac{P_{cyl-f} V_{pig}}{Z_{cyl-f}}\right) + V_{met}\left(\frac{P_{cyl-f}}{Z_{cyl-f}} - \frac{P_{met}}{Z_{met}}\right)\right] \quad \text{(Eq. 19)}$$

At step 230, system 100 readies itself for dosing conduit 106 and cylinder 104 with gas by actuating relays (not shown) to put flow transmitter 112 in control of valves 118 and 120. At step 232, controller 110 transmits the dose parameters to flow transmitter 112, and instructs flow transmitter 112 to begin dosing target cylinder 104 with source gas by opening valves 118 and 120. The dose parameters include (1) the mass 'm' of gas required to add to the system (solved for at steps 226 and 228), and (2) the maximum allowable time for distributing the source gas into cylinder 104. Previously recorded gas fill rates and totals may be reset at step 232.

At step 234, controller 110 communicates with flow transmitter 112 to monitor the status of the dose. As described with reference to FIG. 2, once the dose starts, flow transmitter 112 transmits high-speed data signals requesting instantaneous and cumulative mass flow values from flow meter 114. In response, flow meter 114 transmits high-speed data signals associated with the instantaneous and cumulative mass flow values to flow transmitter 112. At step 234, controller 110 receives the mass flow values from flow transmitter 112.

At step 236, controller 110 adjusts the setting of control valve 116 to maintain the mass flow rate '$\dot{m}$' at the predetermined rate established at step 218. The setting of control valve 116 is changed in response to the measured instantaneous mass flow rate reported by flow meter 114. As described previously, controller 110 may employ a proportional integral derivative (PID) loop to maintain the measured mass flow rate '$\dot{m}$' substantially equal to the calculated mass flow rate '$\dot{m}$' by adjusting the setting of control valve 116.

At step 238, controller 110 calculates the mass of source gas that entered target cylinder 104 during the dose (referred to herein as '$m_{cyl}$'). Once the dose has started, the total mass reported by flow meter 114 will not be equal to the mass of source gas contained within target cylinder 104, because a portion of the gas measured by flow meter 114 will be contained within conduit 106 and pigtail 107. According to one aspect of the invention, the mass of source gas entering target cylinder is expressed by equation 20. In equation 20, the variable '$m_d$' corresponds to the desired mass of gas the user requested to be dosed into the target cylinder 104. The variable '$m_{raw}$' corresponds to the mass reported by the mass flow transmitter 112. The variable '$m_{calc}$' corresponds to the compensated mass calculated in equation 19.

$$m_{cyl} = m_d\left(\frac{m_{raw}}{m_{calc}}\right) \quad \text{(Eq. 20)}$$

At step 240, controller 110 queries the transmitter 112 to determine if target cylinder 104 is filled with the target mass '$m_{cyl}$.' The transmitter 112 compares the value of '$m_{cyl}$' with the mass the user desired to add to target cylinder 104 (i.e., the target mass). If target cylinder 104 has not been filled with the target mass, the dose continues and the process returns to step 234, as shown in FIG. 3C. Once target cylinder 104 is nearly filled with the target mass, flow transmitter 112 closes valves 118 and 120, and the process advances to step 242. As stated previously, flow transmitter 112 closes valves 118 and 120 just prior to filling target cylinder 104 with the target mass of source gas to compensate for the latency of the system 100 by utilizing the Automatic Overshoot Compensation (AOC) algorithm.

At step 242, controller 110 determines if more gas components are needed to fill target cylinder 104. More specifically, more than one gas component may be required for filling target cylinder 104 if the user selected a gas mixture via user interface 108. If more gas components are required, then conduit 106 is purged, vented and exposed to a vacuum source, as described in steps 204 and 206, and the process returns to step 214 for adding another gas component. Additionally, at step 214 gas source 102 is removed from conduit 106 and replaced with another gas source. Alternatively, a system may include multiple gas sources interconnected by a common manifold, as shown in FIGS. 4-6, thereby eliminating the necessity of replacing gas source 102 with another gas source.

If no more gas components are required to fill target cylinder 104, system 100 is vented at step 246, purged at step 248 and vented again at step 250. The venting and purging steps were described previously with reference to steps 204 and 206. The target cylinder 104 may be removed from system 100 once step 250 is complete.

Figure 4:
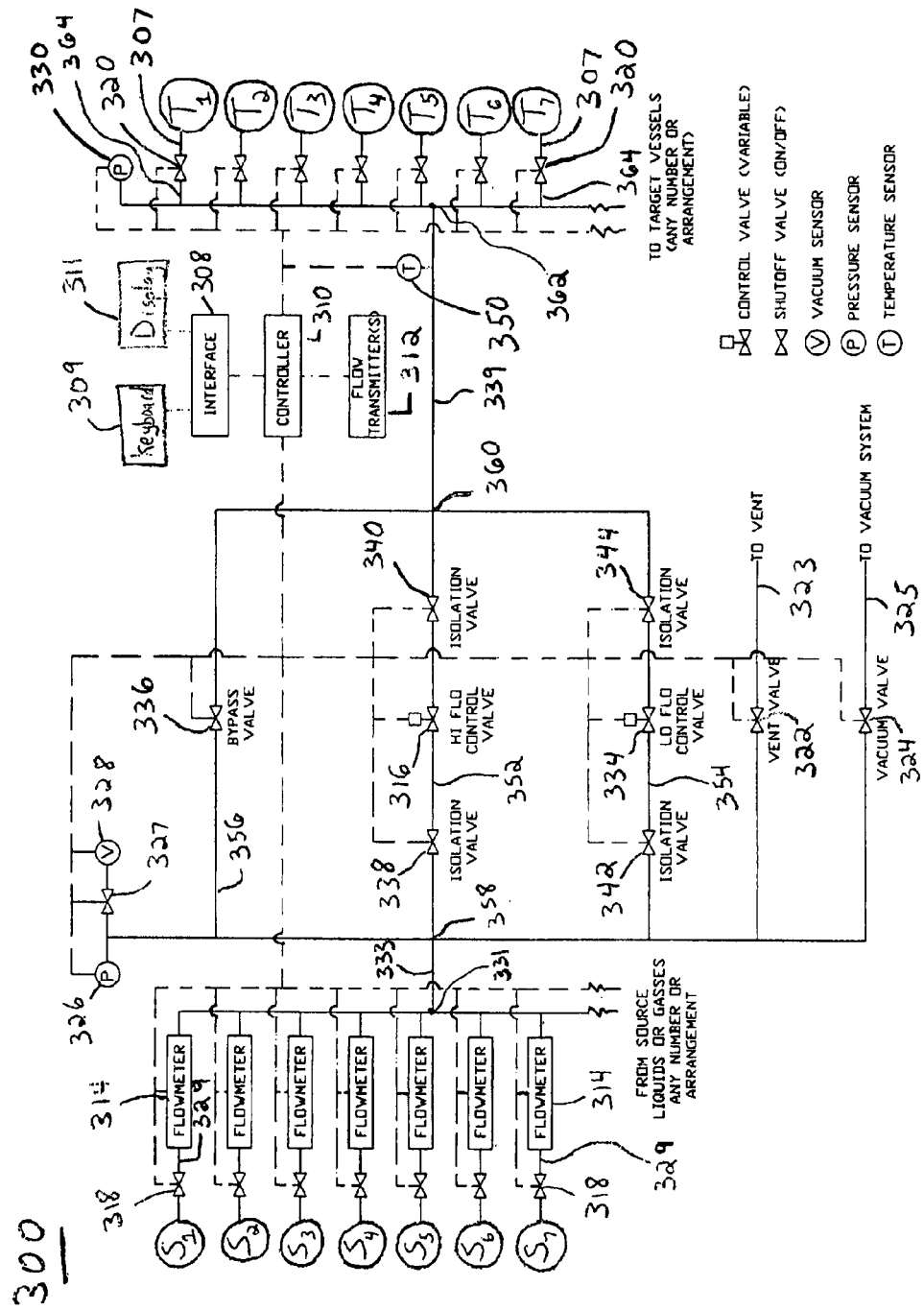
FIG. 4 is a schematic view of another automated vessel filling system according to a second exemplary embodiment of the invention, wherein a flow meter is positioned adjacent each gas source.
Figure 5:
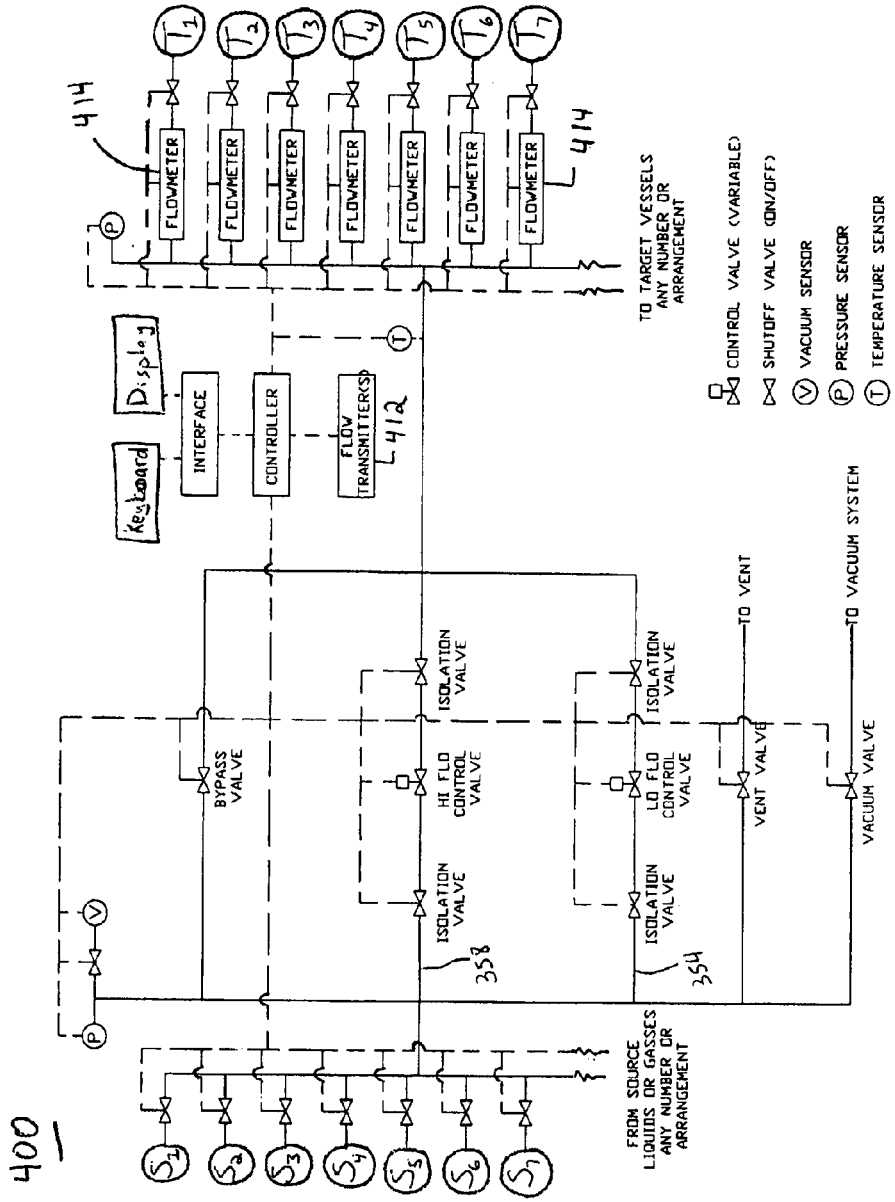
FIG. 5 is a schematic view of yet another automated vessel filling system according to a third exemplary embodiment of the invention, wherein a flow meter is positioned adjacent each target cylinder.
Figure 6:
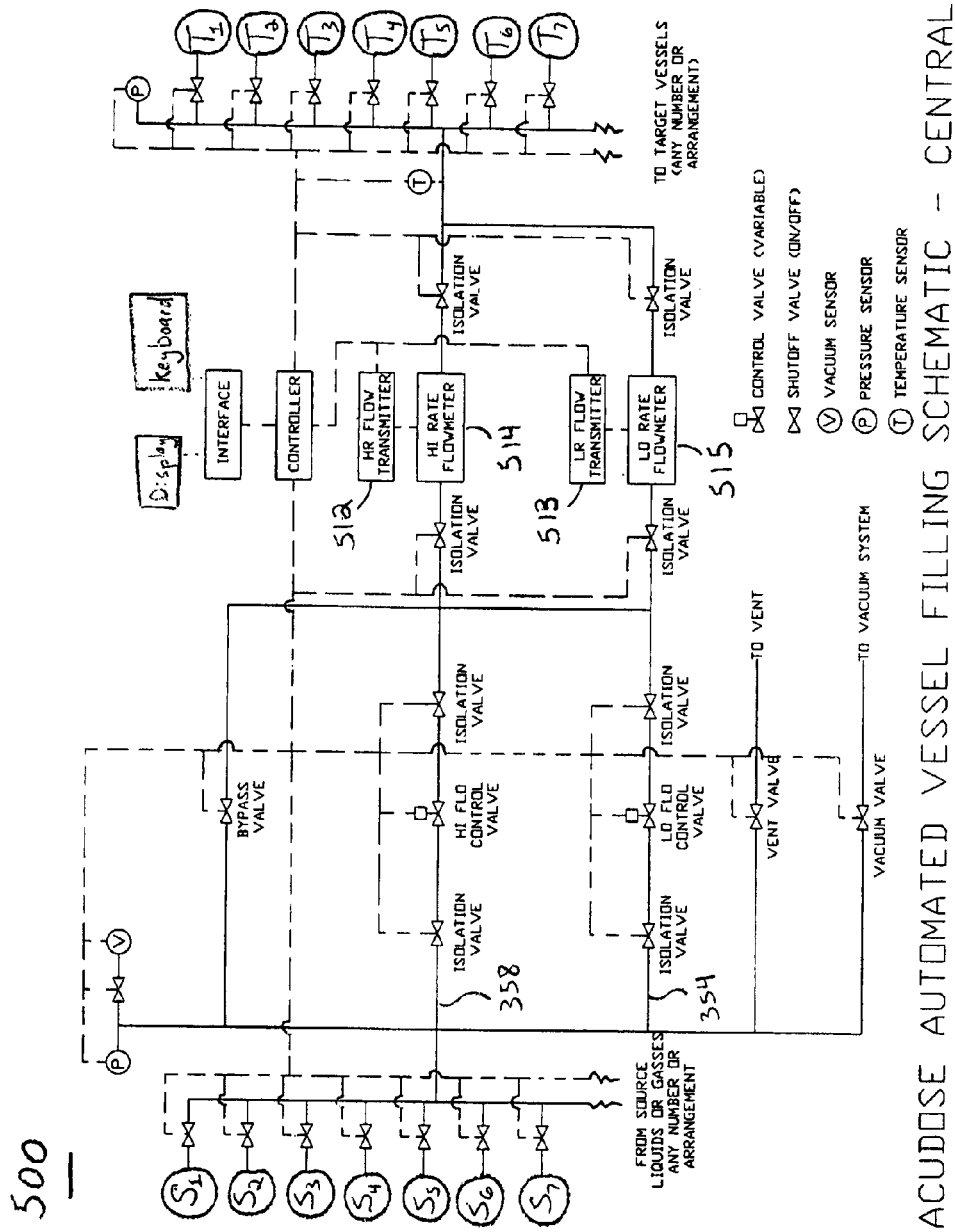
FIG. 6 is a schematic view of still another automated vessel filling system according to a fourth exemplary embodiment of the invention, wherein flow meters are positioned along the high-flow conduit and the low-flow conduit.

FIGS. 4-6 depict alternative embodiments of automated vessel filling systems shown schematically. The alternative automated vessel filling systems 300, 400 and 500 of FIGS. 4-6 are similar in form and function to system 100 of FIG. 1, with certain exceptions. In FIGS. 4-6, gas flow paths are illustrated by solid lines and signal flow paths are illustrated by broken lines. The components that are common between systems 300, 400 and 500 are not numbered in FIGS. 5 and 6.

Referring generally to FIGS. 4-6, each of the alternative automated vessel filling systems generally include multiple gas sources $S_1$ through $S_7$ (referred to collectively as gas source 'S'), multiple target cylinders $T_1$ through $T_7$ (referred to collectively as target cylinder 'T'), and multiple conduits 352, 354 and 356 for selectively delivering gas from the gas sources 'S' to the target cylinders 'T.'

Each target cylinder 'T' is a vessel for receiving compressed gas. Each gas source 'S' may contain a gas, such as Argon, Nitrogen, Oxygen, Acetylene, or Helium, for example. According to one aspect of the invention, each gas source 'S' is filled with a different gas or gas mixture. The systems 300, 400 and 500 may include any number or arrangement of gas sources 'S' and target cylinders 'T.'

Each gas source 'S' is connected to a conduit 329 for delivering gas into system 300, 400 and 500. A discrete valve 318 associated with each gas source 'S' controls the flow of source gas through conduit 329. The outlet ends of conduits 329 are joined at a gas source manifold 331, where the source gases may be combined and mixed together. A conduit 333 extends between gas source manifold 331 and another manifold 358. Three separate conduits 352, 354 and 356 are connected to and extend from manifold 358 for delivering source gas.

The conduits 352, 354 and 356 are positioned in parallel for distributing gas between sources 'S' and target cylinders 'T.' More specifically, a high-flow conduit 352 is provided for distributing a large quantity of gas (e.g., greater than 150 grams), a low-flow conduit 354 is provided for distributing a smaller quantity of gas (e.g., between 0 and 300 grams), and a bypass conduit 356 is provided for distributing a very large quantity of gas (e.g., greater than 1000 grams). Additionally, more than one conduit 352, 354 and 356 may be open at any time during a dose for distributing a large quantity of gas. Utilization of each conduit 352, 354 and 356 is dependent upon the parameters of the dose of source gas.

The bypass conduit 356 includes a discrete valve 336 for controlling the distribution of source gas therethrough. The high-flow conduit 352 includes a variable control valve 316 that is flanked by two discrete valves 338 and 340 for controlling the distribution of source gas therethrough. Similarly, the low-flow conduit 354 also includes a variable control valve 334 that is flanked by two discrete valves 342 and 344 for controlling the distribution of source gas therethrough.

A manifold 360 joins the outlet ends of conduits 352, 354 and 356. A conduit 339 extends between manifold 360 and a target manifold 362. The source gas is distributed from target manifold 362 into individual conduits 364, each conduit 364 being associated with a target cylinder 'T.' A pigtail 307 is releasably coupled between each conduit 364 and each target cylinder 'T' for carrying gas directly into target cylinder 'T.' A discrete valve 320 controls the distribution of gas from conduit 364 to pigtail 307. The pigtail 307 may be a flexible hose, for example.

Each system 300, 400 and 500 includes a vent conduit 323 and an associated vent valve 322, as well as a vacuum conduit 325 for connection to a vacuum source (not shown) and an associated vacuum valve 324. The purpose of the vent and vacuum conduits 323 and 325 were previously described with reference to FIG. 1.

Each system 300, 400 and 500 includes an automated control system for monitoring and controlling the distribution of gas between the gas sources 'S' and the target cylinders 'T.' The automated control system generally comprises a user interface 308, a controller 310, a flow transmitter 312, 412 or 512, and plurality of flow meters 314, 414, or 514. The components of the automated control system may vary from that shown and described herein without departing from the scope of the invention.

With respect to the individual components of the automated control system, user interface 308 may be, for example, a personal computer including a keyboard 309 and a display 311 (such as a monitor). The controller 310 is a common communications interface between user interface 308, the flow transmitter 312, 412 or 512, and the flow meters 314, 414 or 514. The flow meters 314, 414 and 514 may be inertial flow meters or coriolis flow meters for measuring mass.

Similar to system 100 of FIG. 1, data is transmitted to and from controller 310 and the remaining components of the automated control system. The flow transmitter 312, 412 and 512 receives instructions from controller 310 to fill one or more target cylinders 'T' with a pre-determined mass (or volume) of gas from one or more gas sources 'S.'

According to one exemplary use of the invention, once the filling process begins, flow meters 314, 414 or 514 measure the instantaneous and cumulative mass flow totals of the gas flowing therethrough. The flow transmitter 312, 412 or 512 continuously receives instantaneous mass flow rates and cumulative mass flow values from flow meters 314, 414, or 514. The flow transmitter 312, 412 or 512 utilizes the data received from flow meters 314, 414 or 514 to determine when the one or more target cylinders 'T' are filled with the target mass of source gas.

The controller 310 maintains a constant flow rate of gas by adjusting the appropriate variable valve 316 or 334 according to the output of a PID loop, as previously described with reference to step 222 of FIG. 3B. Once the one or more target cylinders 'T' are nearly filled with the target mass of source gas, the flow transmitter 312, 412 or 512 transmits a high speed signal to close one or more of the appropriate discrete valves 318, 338, 336, 340, 342, 344, or 320.

The position of flow meters 314, 414 and 514 vary in the alternative systems 300, 400 and 500. The location of flow meters 314, 414, and 514 is dependent upon the accuracy and pressure rating of the particular flow meter. More specifically, flow meters that are tailored to measure large quantities of gas are typically positioned adjacent a gas source, whereas flow meters that are tailored to measure small quantities of gas are typically positioned adjacent a target cylinder.

In FIG. 4, a flow meter 314 is positioned adjacent each gas source 'S' for measuring the instantaneous mass flow rate and cumulative mass flow of relatively large quantities of gas. In FIG. 5, a flow meter 414 is positioned adjacent each target cylinder 'T' for measuring the instantaneous mass flow rate and cumulative mass flow of relatively small quantities of gas. According to another exemplary embodiment not illustrated herein, flow meters may be positioned adjacent each gas source 'S' and each target cylinder 'T' of a system.

FIG. 6 depicts two flow meters 514 and 515 positioned between the target cylinders 'T' and the gas sources 'S.' Flow meter 514 is coupled to high-flow conduit 358 for measuring the instantaneous mass flow rate and cumulative mass flow of source gas flowing therethrough. Similarly, flow meter 515 is coupled to low-flow conduit 354 for measuring the instantaneous mass flow rate and cumulative mass flow of source gas flowing therethrough. Discrete flow transmitters 512 and 513 communicate with flow meters 514 and 515, respectively, for monitoring a dose, as described with reference to FIG. 2. System 600 may be an industrial-type system for distributing large quantities of low-purity gas (e.g., at least 100 grams per dose).

Referring now to FIGS. 3A-3C and 4, the steps for filling a target cylinder disclosed in FIGS. 3A-3C apply to each of the alternative systems 300, 400 and 500 of FIGS. 4-6. At step 200 the system pressure is monitored via pressure sensors 326 and 330. At step 202, the system monitors the vacuum level by opening valve 327 and monitoring vacuum transducer 328. At step 204, the conduits are filled with a source gas and then vented through conduit 323. At step 206, the system valves are opened (discrete valves 318 remains closed) and a vacuum pumping system (not shown) is connected to conduit 325 to draw a vacuum to evacuate the gas in the system. At step 208, controller 310 monitors the internal pressure of target cylinders 'T' measured by pressure sensor 330. Similarly, at step 210, controller 310 opens valves 327, 336, 338, 340, 342 and 344 and monitors the system vacuum indicated by vacuum transducer 328. Once steps 200 to 210 are complete, the systems 300, 400 and 500 are ready to be dosed with source gas.

Although not shown in FIGS. 3A-3C, prior to step 214, the user instructs system 300 (via keyboard 309 of user interface 308) to fill one or more target cylinders 'T' with a target mass (i.e., a pre-determined quantity of gas) from one or more gas sources 'S.' For example, the user may instruct system 300 to dose target cylinder $T_1$ with 40 grams of nitrogen, and dose target cylinder $T_2$ with 50 grams of oxygen and 20 grams of argon.

Steps 214 to 224 describe the process of dosing the manifolds and conduits of system 300 with gas prior to dosing one or more target cylinders 'T' with gas. Although not shown in FIGS. 3A-3C, prior to step 214, the user instructs system 300 (via keyboard 309 of user interface 308) to dose target cylinders 'T' with a target mass of source gas. At step 214 controller 310 calculates the mass of source gas required to add to the conduits and manifolds to maintain the pressure of those manifolds and conduits greater than the internal pressure of the target cylinder(s) intended to receive gas at step 232.

At step 216, the system 300 readies itself for dosing the conduits and manifolds with gas by actuating relays (not shown) to put flow transmitter 312 in control of one gas source discrete valve 318 and both discrete valves 342 and 344 of low-flow conduit 354.

At step 218, controller 310 transmits the dose parameters to flow transmitter 312, and instructs flow transmitter 312 to begin dosing the system with gas from a single gas source 'S.' After receiving the dose parameters, flow transmitter 312 opens the discrete valves 318, 342 and 344 permitting gas to flow from a gas source 'S' into low-flow conduit 354. The low-flow conduit 354 is utilized in step 218 because a relatively small quantity of gas is required to fill the conduits and manifolds of system 300.

At step 220, controller 310 communicates with flow transmitter 312 to monitor the status of the dose. At step 222 controller 310 adjusts the setting of control valve 334 to maintain the mass flow rate '$\dot{m}$' at the pre-determined rate established at step 218 using a PID loop. The setting of control valve 316 may be changed in response to the instantaneous mass flow rates reported by flow meter 314.

At step 224, controller 310 queries flow transmitter 312 to determine if the dose of source gas into low-flow conduit 354 is complete. If the dose is complete flow transmitter 312 closes valves 318, 342 and 344. If the dose is not complete the process returns to step 220, whereupon controller 310 continues to communicate with flow transmitter 312 to monitor the status of the dose.

Following step 224, the internal pressure of the conduits and manifolds of the system should be greater than the internal pressure of target cylinder 'T' to prevent backflow of the gas within target cylinder 'T' upon opening valve 320 at step 232.

At steps 226 and 228, controller 310 calculates (1) the mass of source gas required to add to system 300, and (2) the final pressure of the target cylinder(s) 'T' (i.e., after dosing target cylinder(s) 'T').

At step 230, system 300 readies itself for dosing one or more target cylinders 'T' with source gas by actuating relays (not shown) to put flow transmitter 312 in control of one gas source discrete valve 318 and both discrete valves 338 and 340 of high-flow conduit 358. The high-flow conduit 352 is utilized in step 232 because a relatively large quantity of gas is required to fill target cylinders 'T.'

At step 232, controller 310 transmits the dose parameters to flow transmitter 312, and instructs flow transmitter 312 to open valves 318, 338 and 340 and begin dosing one or more target cylinders 'T' with source gas. The source gas is distributed from source 'S' to target cylinder 'T' via high flow conduit 352. Previously recorded gas fill rates and totals may be reset at step 232.

Although only one gas source discrete valve 318 may be open during a dose, any number of target cylinder discrete valves 320 may be open for receiving gas from the single gas source. However, it is also envisioned that multiple gas source discrete valves 318 may be open during a dose for creating a gas mixture.

At step 234, controller 310 communicates with flow transmitter 312 to monitor the status of the dose. As described with reference to FIG. 2, once the dose starts, flow transmitter 312 transmits high-speed data signals requesting instantaneous and cumulative mass flow values from flow meter 314. In response, flow meter 314 transmits high-speed data signals associated with the instantaneous and cumulative mass flow values to flow transmitter 312. At step 234, user interface 308 receives the mass flow values from flow transmitter 312.

At step 236, controller 310 may adjust the setting of control valve 316 to maintain the mass flow rate '$\dot{m}$' at the pre-determined rate established at step 218. The setting of control valve 316 is changed in response to the instantaneous mass flow rate reported by flow meter 314. As described previously, controller 310 may employ a proportional integral derivative (PID) loop to adjust the setting of control valve 316.

At step 238, controller 310 calculates the mass of source gas that entered the one or more target cylinders 'T' ($m_{cyl}$) during the dose, in accordance with the equations set forth previously.

At step 240, controller 310 queries flow transmitter 312 to determine if target cylinder(s) 'T' are filled with the target mass 'm.' If target cylinder(s) 'T' have been filled with the target mass, flow transmitter 312 closes valves 318, 338 and 340, and the process advances to step 242. If target cylinder(s) 'T' have not been filled with the target mass, the dose continues and the process returns to step 234, as shown in FIG. 3C.

At step 242, controller 310 determines if more gas components are needed to fill target cylinder(s) 'T.' More than one gas component may be required for filling target cylinder(s) 'T' if the user selected a gas mixture (i.e., more than one gas component) via user interface 308. If more gas components are required, then the conduits and manifolds of system 300 are purged, vented and exposed to a vacuum source, as described in steps 204 and 206, and the process returns to step 214 for adding another gas component. If no more gas components are required to fill target cylinder(s) 'T', system 300 is vented at step 246, purged at step 248 and vented again at step 250. The venting and purging steps were previously described in detail with reference to steps 204 and 206. The target cylinders 'T' may be removed from system 300 upon completion of step 250.

According to one exemplary embodiment of the invention, only one gas source discrete valve 318 is open during a dose and any number of target cylinder discrete valves 320 are open for receiving gas from the single gas source. By virtue of the unique design of system 300, 400 and 500, each target cylinder 'T' may be filled with a different mass of gas. In the course of a dose, flow transmitter 312 may close the discrete valves 318 associated with each target cylinder 'T' at different times. Accordingly, the filled target cylinders 'T' would contain different masses of gas. It follows that the target cylinders 'T' may be different sizes for containing different volumes of gas.

Furthermore, if the target cylinders 'T' are dosed with multiple gas components, each target cylinder 'T' may be filled with a different gas mixture. For example, following a dose of Argon and Nitrogen gas, target cylinder $T_1$ may contain 40 grams of oxygen and 20 grams of Nitrogen, while target cylinder $T_2$ contains 40 grams of oxygen and 40 grams of Nitrogen. Thus, target cylinders $T_1$ and $T_2$ contain different gas mixtures.

According to another exemplary embodiment of the invention, multiple gas source discrete valves 318 may be open during a dose for creating a gas mixture in one or more target cylinders 'T.'

While preferred embodiments of the invention have been described herein, it will be understood that such embodiments are provided by way of example only. Numerous variations, changes and substitutions will occur to those skilled in the art without departing from the spirit of the invention. For example, the automated vessel filling systems disclosed herein are not limited to distributing gas into target cylinders. The systems may also be configured to distribute liquids, gases, flammable or non-flammable fluids, water, industrial mixtures, hydrocarbon mixtures, reactor gas mixtures or any other fluid. It is intended that the appended claims cover all such variations as fall within the spirit and scope of the invention.

APPENDIX A

Equation A-1 illustrates a formula to solve for the compressibility factor 'Z'. In equation A-1, the prime markings do not indicate a derivative.

$$Z^3 + (\delta' - B' - 1)Z^2 + [\Theta' + \varepsilon' - \delta'(B'+1)]Z - [\varepsilon'(B'+1) + \Theta'B'] = 0 \quad \text{(Eq. A-1)}$$

$$\text{Where, } B' = \frac{bP}{RT} \quad \delta' = \frac{\delta P}{RT} \quad \Theta' = \frac{\Theta P}{(RT)^2} \text{ and } \varepsilon' = \frac{\varepsilon P}{RT} \quad \text{(Eq. A-2)}$$

The full polynomial is expressed in equation A-3.

$$Z^3 + \left(\frac{\delta P}{RT} - \frac{bP}{RT} - 1\right)Z^2 + \left[\frac{\Theta P}{(RT)^2} + \frac{\varepsilon P}{RT} - \frac{\delta P}{RT}\left(\frac{bP}{RT} + 1\right)\right]Z - \left[\frac{\varepsilon P}{RT}\left(\frac{bP}{RT}+1\right) + \frac{\Theta P}{(RT)^2}\left(\frac{bP}{RT}\right)\right] = 0 \quad \text{(Eq. A-3)}$$

The parameters for equation A-3 are as follows:

$$\delta = b \quad \varepsilon = 0 \quad \Theta = a\alpha(T_r)$$

$$\alpha(T_r) = [1 + (0.48 + 1.574\omega - 0.176\omega^2)(1 - T_r^{0.5})]^2$$

$$a = 0.42748 \frac{(RT_C)^2}{P_C} \quad b = 0.08664 \frac{RT_C}{P_C}$$

The parameters $\omega$, $T_C$, and $P_C$ are gas specific constants and the values for each parameter are located in Appendix B. Once all of the parameters are entered into the polynomial, the polynomials roots may be solved for. The Z factor for vapor will be the largest of the polynomial roots.

APPENDIX B

The following is a table of constants for the basic gases that may be used by a dynamic gas filling system:

| Gas | Molar Mass (g/mol) | Pc (psia) | Tc (K) | ω |
|---|---|---|---|---|
| Carbon Dioxide | 44.0096 | 1070 | 304.12 | 0.225 |
| Helium | 4.0026 | 32.9 | 5.19 | −0.39 |
| Oxygen | 31.9989 | 731.4 | 154.58 | 0.025 |
| Argon | 39.9481 | 710.4 | 150.86 | −0.002 |
| Nitrogen | 28.0134 | 492.8 | 126.2 | 0.037 |

What is claimed:

1. A system for sequentially filling one or more target cylinders with a pre-determined quantity of a single gas or liquid component, said system comprising:
   at least one gas source;
   at least one target cylinder for receiving gas from the gas source;
   at least one conduit for distributing gas between the gas source and the target cylinder;
   at least one discrete valve for controlling the flow of gas through the at least one conduit, wherein the discrete valve may only be maintained in an open position or a closed position;
   a controller that is configured to calculate the mass of the pre-determined quantity of the single gas component that is required to be added to the target cylinder to achieve the pre-determined quantity of gas by accounting for an absolute temperature of the gas component, a pressure within the at least one target cylinder, an internal pressure of the at least one conduit, a molar mass of the gas component, a compressibility factor of the gas component rated at the internal pressure of the target cylinder, a compressibility factor of the gas component rated at the internal pressure of the at least one conduit and a volume of at least a portion of the at least one conduit;
   at least one Coriolis mass flow meter that is coupled to the conduit and configured for: (i) measuring a mass value of the single gas component flowing through the conduit, and (ii) continuously transmitting instantaneous mass flow rate measurements and cumulative mass flow totals of the single gas component flowing through the mass flow meter; and
   at least one flow transmitter configured for; (i) receiving the calculated mass from the controller: (ii) biasing the discrete valve to an open position to permit the flow of gas through the at least one conduit, (iii) continuously receiving the instantaneous mass flow rate and cumulative mass flow total from the Coriolis mass flow meter, (iv) comparing the calculated mass with the instantaneous mass flow rate and cumulative mass flow total reported by the Coriolis mass flow meter, (v) determining when the target cylinder will receive the calculated mass of gas based upon the comparison step, (vi) biasing the discrete valve to a closed position prior to filling the target cylinder with the calculated mass of gas to compensate for a known latency of the system, and (vii) filling the target cylinder with a quantity of gas that is substantially equal to the calculated mass of gas.

2. The system of claim 1 wherein the mass flow meter is positioned proximal to the gas source.

3. The system of claim 1 wherein the mass flow meter is positioned proximal to the target cylinder.

4. The system of claim 1 further comprising a target manifold for distributing gas from the conduit to a plurality of target cylinders.

5. The system of claim 1 further comprising a gas source manifold for distributing gas from a plurality of discrete gas sources to the conduit.

6. The system of claim 5 further comprising a target manifold for distributing gas from the conduit to a plurality of target cylinders, wherein the at least one conduit extends between the source manifold and the target manifold for distributing gas between one or more of the plurality of discrete gas sources to one or more of the plurality of target cylinders.

7. The system of claim 6 further comprising a plurality of conduits each coupled in fluid communication with the supply manifold and the target manifold, wherein the plurality of conduits are arranged in parallel for selectively distributing gas between the gas sources and the cylinders.

8. The system of claim 7 further comprising a plurality of mass flow meters, wherein each mass flow meter is associated with one of the plurality of conduits for measuring a mass value of the gas flowing through the associated conduit.

9. The system of claim 7, wherein an interior cross-sectional area of each conduit of the plurality of conduits is not equal.

10. The system of claim 1 wherein the mass value is selected from the group consisting of an instantaneous mass flow rate and a cumulative mass flow.

11. The system of claim 1 further comprising at least one variable valve for controlling the flow of gas through the at least one conduit.

12. The system of claim 11 wherein the controller receives the instantaneous mass flow rate of the gas from the flow transmitter and adjusts the variable valve to maintain the mass flow rate of the gas flowing through the at least one conduit substantially constant.

13. The system of claim 12 wherein the controller employs a proportional-integral-derivative (PID) loop to monitor the instantaneous mass flow rate of the gas flowing through the at least one conduit, and bias the variable valve in response to the output of the PID loop to maintain the mass flow rate of the gas flowing through the at least one conduit substantially constant.

14. The system of claim 1 wherein the flow transmitter is configured to continuously request the instantaneous mass flow rate and cumulative mass flow total from the mass flow meter.

15. A system for sequentially filling one or more target cylinders with a pre-determined quantity of a single fluid component, said system comprising:
    at least one gas source;
    at least one target cylinder for receiving gas from the gas source;
    at least one conduit for distributing gas between the gas source and the target cylinder;
    at least one valve for controlling the flow of gas through the at least one conduit;
    a controller that is configured to calculate the mass of the pre-determined quantity of the single fluid component that is required to be added to the target cylinder to achieve the pre-determined quantity of fluid;
    at least one Coriolis mass flow meter that is coupled to the conduit and configured for: (i) measuring a mass value of the single fluid component flowing through the conduit, and (ii) continuously transmitting a cumulative mass flow total of the single fluid component flowing through the mass flow meter; and
    at least one flow transmitter configured for: (i) receiving the calculated mass from the controller; (ii) biasing the valve to an open position to permit the flow of fluid through the at least one conduit, (iii) continuously receiving the cumulative mass flow total from the Coriolis mass flow meter, (iv) comparing the calculated mass with the cumulative mass flow total reported by the Coriolis mass flow meter, (v) determining when the target cylinder will receive the calculated mass of fluid based upon the comparison step, (vi) biasing the valve to a closed position prior to filling the target cylinder with the calculated mass of fluid to compensate for a known latency of the system, and (vii) filling the target cylinder with a quantity of fluid that is substantially equal to the calculated mass of fluid.

* * * * *